Figure 1:
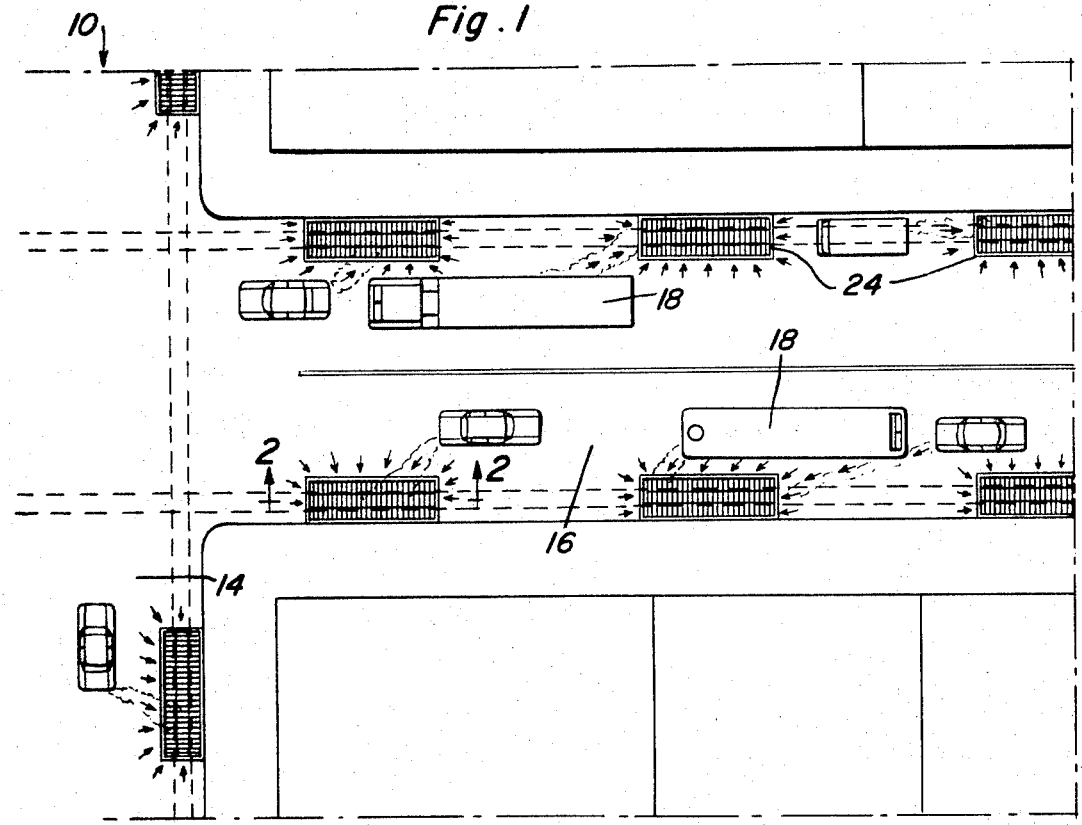

United States Patent [19]
Williams, Sr.

[11] 3,747,502
[45] July 24, 1973

[54] AIR POLLUTION CONTROL SYSTEM
[76] Inventor: John T. Williams, Sr., 329 I St., Rock Springs, Wyo. 82901
[22] Filed: June 14, 1971
[21] Appl. No.: 152,687

[52] U.S. Cl............................ 98/43, 98/49, 98/58, 55/385, 55/DIG. 30, 55/432, 404/4
[51] Int. Cl............................................... F24f 7/06
[58] Field of Search...................... 55/385, DIG. 30, 55/432; 98/58–60, 49, 43; 404/4

[56] References Cited
UNITED STATES PATENTS

| | | | |
|---|---|---|---|
| 673,520 | 5/1901 | Brey et al. | 98/58 |
| 1,080,468 | 12/1913 | Melvin | 98/49 |
| 2,776,656 | 1/1957 | Brown, Jr. | 98/58 |
| 2,826,263 | 3/1958 | Stowe | 55/525 |
| 3,063,686 | 11/1962 | Irvin | 55/256 |
| 3,385,196 | 5/1968 | Messen-Jaschin | 55/385 |
| 3,434,267 | 3/1969 | Messen-Jaschin | 98/49 |
| 3,482,377 | 12/1969 | Walrave | 55/385 |
| 3,503,188 | 3/1970 | Gardner | 55/385 |
| 3,643,581 | 2/1972 | Feldman | 239/14 |
| 3,260,036 | 7/1966 | Bellis | 55/261 |

*Primary Examiner*—Bernard Nozick
*Attorney*—Clarence A. O'Brien and Harvey B. Jacobson

[57] ABSTRACT

A street level and factory exhaust air handling system utilizing existing underground sewers to draw off street level air and contaminating vehicle exhaust gases as well as gaseous factory waste and functioning to pump the contaminated street level air and gaseous factory wastes upwardly through very tall smokestacks for jet discharging from the upper ends of the smokestacks into upper elevation air for more rapid dispersion and movement to remote areas by the higher velocity air currents which occur at higher altitudes.

3 Claims, 3 Drawing Figures

PATENTED JUL 24 1973 3,747,502

SHEET 1 OF 2

John T. Williams, Sr.
INVENTOR

BY Clarence A. O'Brien
and Harvey B. Jacobson
Attorneys

AIR POLLUTION CONTROL SYSTEM

The air pollution control system of the instant invention utilizes existing underground sewer systems including either curb opening and/or street level inlets and incorporates a high volume air pump for drawing motor vehicle exhaust polluted street level air into the underground sewer passages. The system also may be communicated with gaseous waste outlets for factories and the like and further utilizes the high volume pump to discharge the polluted air upwardly through tall smokestacks at high velocity for subsequent upward jetting from the smokestacks into the upper levels of the air above cities.

This type of air pollution control is adaptable to substantially all cities and is particularly effective in reducing air pollution over cities which are situated in geographical depressions.

The main object of this invention is to provide an air pollution control system which will be effective in collecting ground level gaseous air contaminants, ducting the collected contaminants to a remote location and then discharging the gaseous contaminants upwardly from a high smokestack at high velocity for rapid dispersion by the higher velocity air currents which usually prevail at high elevations.

Another object of this invention is to provide an air pollution control system which will be operative not only to collect vehicle exhaust contaminated street level air but which may also be utilized to collect factory gaseous wastes for discharging into the higher elevation air over or adjacent a city.

Yet another object of this invention is to provide an air pollution control system in accordance with the preceding objects utilizing existing underground sewer passages and which will therefore enable the air pollution control system to be more quickly adopted by cities at a relatively low cost.

A final object of this invention to be specifically enumerated herein is to provide an air pollution control system which will conform to conventional forms of manufacture, be of simple construction and efficient in operation so as to provide a device that will be economically feasible, long lasting and relatively trouble-free.

Figure 2:
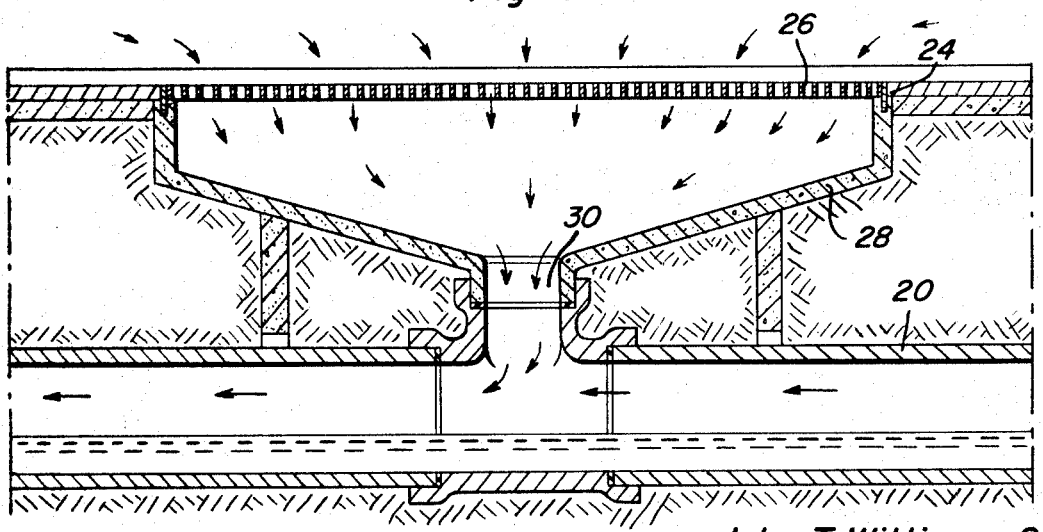
Figure 3:
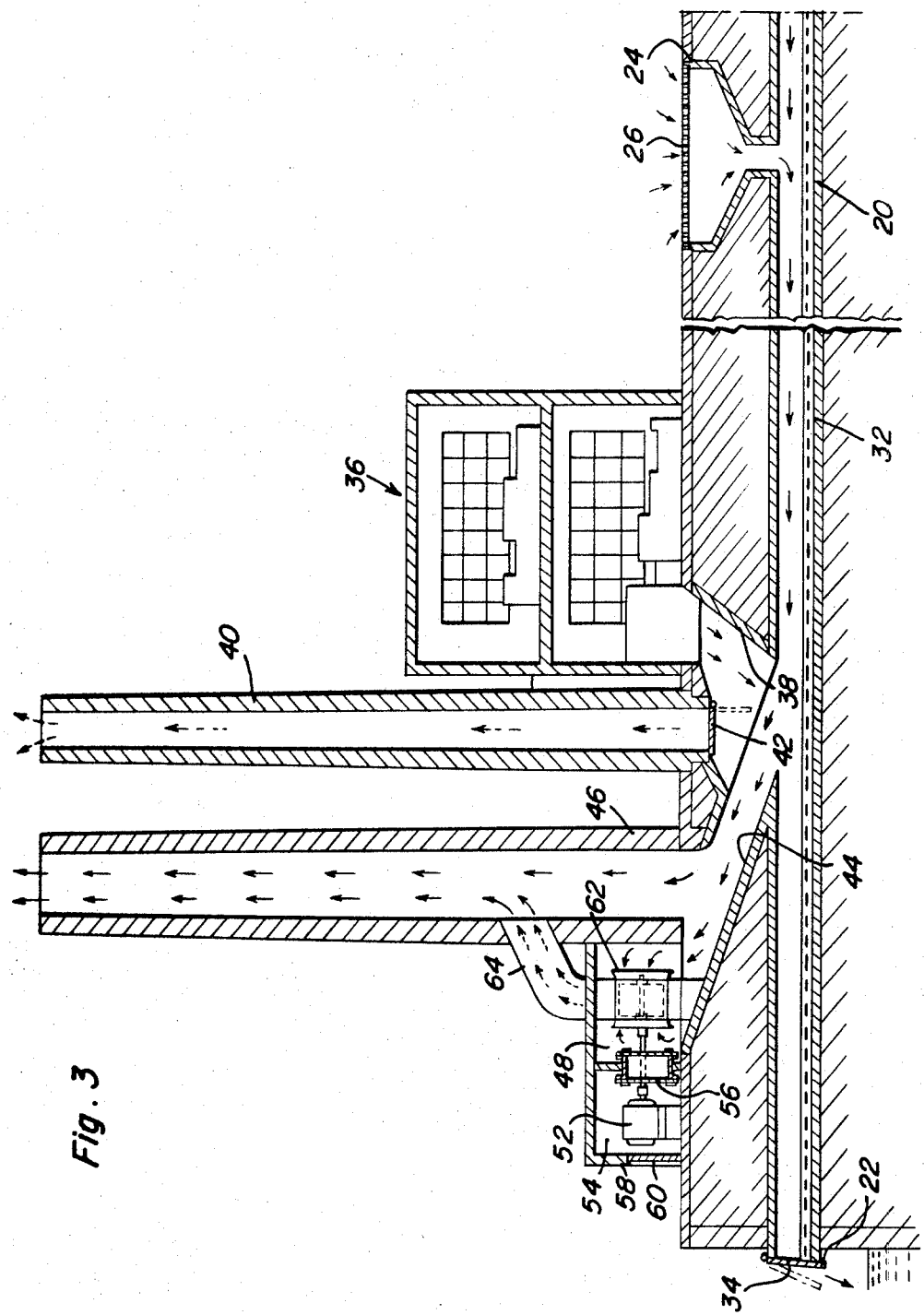

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a top plan view of a portion of a conventional city street system utilizing street level air intakes for the city street sewer inlets;

FIG. 2 is an enlarged fragmentary vertical sectional view taken substantially upon the plane indicated by the section line 2—2 of FIG. 1; and FIG. 3 is a fragmentary vertical sectional view illustrating the manner in which the air pollution control system of the instant invention is utilized to upwardly discharge gaseous factory wastes and engine exhaust polluted air from street level intakes upwardly through high exhaust stacks into the upper air currents above a city.

Referring now more specifically to the drawings, the numeral 10 generally designates a city street system including first and second crossing streets 14 and 16 along which various forms of internal combustion engine propelled vehicles 18 are driven.

The street system 10 includes underground sewer pipes 20 for conveying waste liquids to a point of discharge 22, see FIG. 3. The pipes 20 extend along the streets 14 and 16 below the latter and in most cases a pipe 20 extends along each curb side of every street.

The streets 14 and 16 have street level sewer inlet openings 24 formed therein and over which suitable gratings 26 are secured. The openings or inlets 24 open downwardly into catch basins 28 having lower central drain outlets which are communicated with the corresponding sewer pipes 20.

The sewer pipes 20 converge toward and open into a main sewer discharge pipe 32 which defines the point of discharge 22 at its discharge end and the dsicharge end of the pipe 32 is provided with a one-way flap valve 34 which prevents the flow of fluids from the ambient area into the pipe 32 but allows the free discharge of fluids within the pipe 32 at the point of discharge 22.

A factory is illustrated in FIG. 3 of the drawings and is referred to by the reference numeral 36. The factory 36 includes a waste gas outlet 38 and its own smokestack 40 into the lower end of which the waste gas outlet 38 conventionally opens. However, the lower end of the smokestack 40 is provided with a manually operable seal 42 and the waste gas outlet 38 opens downwardly into the pipe 32. At the point of juncture of the waste gas outlet 38 with the pipe 32, the pipe 32 includes an upwardly inclined branch passage 44 which opens into the lower end of a high large capacity smokestack 46. In addition, the branch passage 44 also opens into a chamber 48 in which a high capacity blower 50 is disposed. The blower 50 is driven by a high capacity motor 52 disposed in its own closed chamber 54 and the chambers 48 and 54 are maintained out of communication with each other by means of an openable air lock assembly 56 through which service personnel may move from the chamber 54 into the chamber 50. In addition, the structure 58 which houses the chambers 48 and 54 includes a door 60 which opens into the chamber 54 and through which service personnel may gain access not only to the chamber 54 but also the chamber 48 through the air lock assembly 56.

The blower 50 includes a pair of opposite side inlets 62 and a discharge pipe 64 which opens into the lower end of the smokestack 46 above the branch passage 44. Thus, at least a portion of the air conveyed through the pipes 20 and into the pipe 32 for subsequent movement through the branch passage 44 is pumped through the chamber 48 and discharged into the smokestack 46 in an upward direction therein for discharge upwardly through the smokestack 46 and into the higher elevation air thereabove. Of course, the upward discharging of air from the blower 50 into the smokestack 46 creates a reduced pressure area in the smokestack 46 immediately below the discharge of blower air thereinto and the remaining gases which are not pumped through the blower 50 are conveyed upwardly through the smokestack 46 by venturi action.

In operation, whenever the blower 50 is in operation street level air and contaminating combustion engine exhaust is drawn into the sewer pipes 20 through the catch basins 28 and thus is prevented from contaminating the air above the streets 14 and 16. The air drawn into the pipes 20 is then rapidly conveyed to a location, perhaps remote from the city, and discharged upwardly through the smokestack 46 with the gaseous waste being discharged from the factory 36. The air, vehicle exhaust pollution and gaseous factory waste jetted upwardly through the tall smokestack 46 at high speed is discharged from the upper end thereof in jet fashion for continued upward movement into the higher air above the upper end of the smokestack 46 for rapid dispersion and movement to remote areas by the higher velocity air currents which usually prevail at higher elevations. Thus, the system is operable to efficiently draw off engine exhaust contaminated street level air and to duct this contaminated air to a remote location for subsequent upward discharging into the higher elevation air together with certain factory gaseous wastes.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An air pollution controlling system comprising, in combination, a roadway having opposite side marginal portions and over which combustion engine propelled vehicles travel, an underground conduit extending along said roadway, a plurality of inlet passages for said conduit including inlet and outlet ends, said outlet ends opening into said conduit and said inlet ends being spaced along said roadway and disposed at a level at least closed adjacent the upper surface of said roadway, said conduit extending to a remote outlet location, air blower means operatively associated with said conduit for pumping air therethrough from said inlet ends of said inlet passages to said outlet location, said underground conduit comprising an underground sewer pipe and said inlet ends of said inlet passages comprising street level inlets for said underground sewer pipe, said remote outlet location including an upstanding high chimney, the lower end of said chimney being communicated with said conduit, said conduit including a generally horizontal outlet end defining a liquid outlet and provided with check valve means for preventing the flow of fluid into the outlet end of said conduit, said lower end of said chimney being communicated with said conduit upstream from said outlet end thereof, said blower means being operatively associated with the lower end portion of said chimney and operative to pump at least a portion of the air flowing into the lower end of said chimney from said conduit through said blower means, said blower means including an outlet therefor opening upwardly in said chimney above the lower end thereof, said check valve means comprising an upstanding flap valve member pivotally supported at its upper marginal portion from the upper marginal portion of the outlet end of said conduit for swinging about a horizontal transverse axis, said flap valve member, when in the closed position, overlying the end face of the outlet end of said conduit.

2. The combination of claim 1 wherein said street level inlets comprise openings opening upwardly through the upper surface of said roadway and covered by grating.

3. The combination of claim 1 including a source of gaseous industrial waste, means communicating said source of gaseous industrial waste with said conduit at said outlet location.

* * * * *